US010514121B2

(12) United States Patent  
Wada

(10) Patent No.: US 10,514,121 B2  
(45) Date of Patent: Dec. 24, 2019

(54) EMERGENCY DETACHABLE PIPE COUPLING

(71) Applicant: NITTO KOHKI CO., LTD., Tokyo (JP)

(72) Inventor: Akihiro Wada, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 248 days.

(21) Appl. No.: 15/670,235

(22) Filed: Aug. 7, 2017

(65) Prior Publication Data

US 2017/0336005 A1    Nov. 23, 2017

Related U.S. Application Data

(63) Continuation of application No. PCT/JP2016/053856, filed on Feb. 9, 2016.

(30) Foreign Application Priority Data

Feb. 13, 2015 (JP) .................................. 2015-026110  
Mar. 30, 2015 (JP) .................................. 2015-068629

(51) Int. Cl.
*F16L 37/23* (2006.01)
*F16L 37/32* (2006.01)

(52) U.S. Cl.
CPC ............... *F16L 37/23* (2013.01); *F16L 37/32* (2013.01)

(58) Field of Classification Search
CPC ............................. F16L 2201/20; F16L 37/23
USPC .......................................................... 285/1, 2
See application file for complete search history.

(56) References Cited

U.S. PATENT DOCUMENTS

| | | | | |
|---|---|---|---|---|
| 4,269,226 A | * | 5/1981 | Allread | ................... F16L 37/23 285/1 |
| 4,800,913 A | * | 1/1989 | Nitzberg | ............. F16L 55/1015 285/1 |
| 5,320,133 A | | 6/1994 | Nimberger | |
| 5,335,947 A | * | 8/1994 | Remsburg | ............... F16L 37/23 285/267 |

(Continued)

FOREIGN PATENT DOCUMENTS

| | | |
|---|---|---|
| JP | 7-35893 | 7/1995 |
| JP | 2003-14186 | 1/2003 |

(Continued)

OTHER PUBLICATIONS

International Search Report dated May 10, 2016 in International (PCT) Application No. PCT/JP2016/053856.

*Primary Examiner* — David Bochna  
(74) *Attorney, Agent, or Firm* — Wenderoth, Lind & Ponack, L.L.P.

(57) ABSTRACT

An emergency detachable pipe coupling configured to decouple a female coupling member and a male coupling member which are coupled together when an external force makes the male coupling member tilted at a predetermined angle relative to a female coupling member. When the male coupling member is tilted, a pressing surface of the male coupling member presses a to-be-pressed surface of a locking element restraining member of the female coupling member to displace the locking element restraining member to a release position where a locking element becomes displaceable to an unlocking position.

16 Claims, 7 Drawing Sheets

(56) References Cited

U.S. PATENT DOCUMENTS 7,021,345 B2 * 4/2006 Webb .................. F16L 55/1015
285/1
2013/0125989 A1 5/2013 Clever et al.

FOREIGN PATENT DOCUMENTS

| JP | 2013-104541 | 5/2013 |
| JP | 5570494 | 8/2014 |

* cited by examiner

EMERGENCY DETACHABLE PIPE COUPLING

TECHNICAL FIELD

The present invention relates to an emergency detachable pipe coupling configured to decouple a female coupling member and a male coupling member, which are in use being coupled together, when a force of a magnitude greater than a given magnitude acts thereon such that the female and male coupling members are tilted relative to each other.

BACKGROUND ART

In a conventional pipe coupling, a female coupling member and a male coupling member, when coupled together, are held with a locking element so as not to detach from each other. Accordingly, when excessive tensile force is, for some reason, applied to piping connected to the pipe coupling, the piping or a device connected to the piping, for example, may be broken, which may cause an unexpected accident. To prevent such an accident, there have been developed emergency detachable pipe couplings (Japanese Utility Model Registration Application Publication No. Hei 7-35893 and Japanese Patent No. 5,570,494 configured such that when an external force of a magnitude greater than a given magnitude is applied in a direction in which a female coupling member and a male coupling member are forced to separate from each other, the female and male coupling members detach from each other, thereby preventing breakage of the piping and so forth.

The above-described conventional emergency detachable pipe coupling is disadvantageous as will now be explained. When an external force of a magnitude greater than a given magnitude acts on the female coupling member and the male coupling member in the longitudinal axis direction of the pipe coupling, the female and male coupling members are detached from each other. However, when pipings which are connected to the female and male coupling members, respectively, are bent relative to each other and hence high bending stress is applied to the pipings and the pipe coupling, for example, even if the bending stress is so high that the pipings or the pipe coupling may be broken, the force acting on the pipe coupling in the tensile direction along the longitudinal axis direction may not be so great, so that the pipe coupling may fail to be decoupled.

SUMMARY OF THE INVENTION

The present invention has been made in view of the above-described problem of the conventional technique, and an object of the present invention is to provide an emergency detachable pipe coupling configured to decouple a female coupling member and a male coupling member, which are in use being coupled together, when an external force of a magnitude greater than a given magnitude acts thereon such that the female and male coupling members are tilted relative to each other.

The present invention provides an emergency detachable pipe coupling including a female coupling member having a female-side passage extending from a forward end opening to a rear end opening, and a male coupling member having a male-side passage extending from a forward end opening to a rear end opening and further having a connecting end portion at a forward end thereof. The male coupling member is configured to be coupled to the female coupling member with the connecting end portion inserted into the female-side passage from the forward end opening of the female coupling member such that the male-side passage and the female-side passage are communicated with each other. The female coupling member includes the following: a cylindrical female coupling body having the female-side passage; a locking element retained by the female coupling body displaceably between a locking position where the locking element projects from an inner peripheral surface of the female coupling body to engage a locking element engaging surface of the male coupling member to thereby lock the male coupling member and an unlocking position where the locking element is displaced radially outward of the female coupling body from the locking position to disengage from the locking element engaging surface; a locking element restraining member attached to the female coupling body displaceably relative to the locking element between a restraining position where the locking element restraining member restrains the locking element in the locking position and a release position where the locking element restraining member allows the locking element to be displaced to the unlocking position; and an urging member disposed between the female coupling body and the locking element restraining member to urge the locking element restraining member toward the locking position. The male coupling member has a pressing surface, and the locking element restraining member has a to-be-pressed surface to be engaged and pressed by the pressing surface. When the female coupling member and the male coupling member are in a coupled state, the male coupling member is tiltable relative to a longitudinal axis of the female-side passage. When the male coupling member is tilted at a predetermined angle, the pressing surface presses the to-be-pressed surface, causing the locking element restraining member to be displaced to the release position, and allowing the connecting end portion of the male coupling member to come out of the female coupling member.

In the emergency detachable pipe coupling, when pipings which are connected to the female and male coupling members, respectively, are bent relative to each other and consequently high bending stress is applied to the pipings and the pipe coupling, for example, the male coupling member is tilted relative to the female coupling member, and the female coupling member and the male coupling member become decouplable and are thus detached from each other. Therefore, it is possible to prevent breakage of the pipings and devices connected thereto due to the high bending stress.

Preferably, the locking element restraining member may be displaceable between the restraining position and the release position in the direction of the longitudinal axis of the female-side passage.

More preferably, the connecting end portion may have a spherical surface and rotate about the center of curvature of the spherical surface when the male coupling member is tilted until the locking element restraining member reaches the release position.

More preferably, the locking element engaging surface may comprise a part of the spherical surface.

With the above-described arrangement, the male coupling member is capable of smoothly tilting in any direction; therefore, the female and male coupling members can be decoupled from each other no matter in which direction bending stress acts thereon.

Preferably, the arrangement may be as follows. When the locking element restraining member is displaced from the restraining position to the release position in response to tilting of the male coupling member, the locking element restraining member is stopped from displacement in the direction of the longitudinal axis by the female coupling body, and the male coupling member rotates about a fulcrum defined by a point of engagement between the to-be-pressed surface of the locking element restraining member, which has been stopped, and the pressing surface of the male coupling member, thereby allowing the connecting end portion to be moved in a direction in which the connecting end portion comes out of the female-side passage.

With the above-described arrangement, the male coupling member can be completely pulled out of the female coupling member even more reliably after the female coupling member and the male coupling member have become decouplable from each other.

Preferably, the female coupling member further includes a female-side valve member displaceable between a closed position where the female-side valve member closes the female-side passage and an open position where the female-side valve member opens the female-side passage, and a female-side valve urging member urging the female-side valve member toward the closed position. The female-side valve member has a conical seal surface engageable with the spherical surface of the connecting end portion. When the connecting end portion of the male coupling member is inserted into the female-side passage, the spherical surface of the connecting end portion engages the conical seal surface of the female-side valve member and presses and displaces the female-side valve member to the open position, and when the male coupling member is tilted, the spherical surface slides in sealing contact with the conical seal surface.

More preferably, the male coupling member further includes a male-side valve member displaceable between a closed position where the male-side valve member closes the male-side passage and an open position where the male-side valve member opens the male-side passage, and a male-side valve urging member urging the male-side valve member toward the closed position. When the connecting end portion of the male coupling member is inserted into the female-side passage, the male-side valve member engages the female-side valve member and is pressed and displaced to the open position.

With the above-described arrangement, it is possible to prevent a fluid in the female coupling member or the male coupling member from leaking to the outside after the female and male coupling members have been decoupled from each other.

Preferably, the to-be-pressed surface of the locking element restraining member may be located forward in the direction of the longitudinal axis relative to the position of the center of curvature when the female coupling member and the male coupling member are coupled together, and may be inclined forward in the direction of the longitudinal axis toward radially outside of the female coupling body.

Because the to-be-pressed surface is located as stated above, a point on the to-be-pressed surface at which the pressing surface engages the to-be-pressed surface gradually shifts outward as the male coupling member is tilted. Moreover, because the to-be-pressed surface is inclined as stated above, the distance through which the locking element restraining member is pressed in response to tilting of the male coupling member increases by an amount corresponding to the inclination. Accordingly, the amount of displacement of an outer sleeve with respect to the tilting increases, and thus the locking element restraining member can be displaced to the release position by tilting at a smaller angle.

Preferably, the locking element restraining member includes an inner sleeve slidably disposed over an outer peripheral surface of the female coupling body to engage the locking element, and an outer sleeve having the to-be-pressed surface and slidably disposed over an outer peripheral surface of the inner sleeve. The urging member comprises a first spring urging the outer sleeve, and a second spring urging the inner sleeve. The inner sleeve is pressed against the outer sleeve by the second spring and displaced together with the outer sleeve when the locking element restraining member is displaced from the restraining position to the release position. When the inner sleeve is displaced against the urging force of the second spring from a position where the locking element restraining member is in the restraining position, without displacing the outer sleeve, the inner sleeve and the locking element are disengaged from each other, and the locking element becomes displaceable to the unlocking position.

More preferably, the outer sleeve has an opening extending therethrough from an outer peripheral surface to inner peripheral surface thereof, so that a part of the outer peripheral surface of the inner sleeve is exposed through the opening.

With the above-described arrangement, the locking element can be brought into a state where the locking element is displaceable to the unlocking position by retracting only the inner sleeve without displacing the outer sleeve. Thus, a couplable state can be achieved with a smaller force than in a case where both the outer sleeve and the inner sleeve are displaced against the urging force of the first and second springs to couple the male coupling member to the female coupling member.

Preferably, the female coupling body has an outer body part and an inner body part slidably disposed in the outer body part to retain the urging member and the locking element. When the male coupling member is pulled away from the female coupling member in the direction of the longitudinal axis, the inner body part which has been locked to the connecting end portion by the locking element is displaced, together with the male coupling member, in the direction of the longitudinal axis relative to the outer body part and the locking element restraining member. Thus, the locking element restraining member reaches the release position.

With the above-described arrangement, the female and male coupling members can be decoupled from each other not only when the male coupling member receives a force that tilts the male coupling member, but also when the male coupling member receives a force that pulls the male coupling member in the direction of the longitudinal axis.

Preferably, the emergency detachable pipe coupling may further include a pressure chamber and a communication hole. The pressure chamber is formed between an inner peripheral surface of at least one of the outer body part and the locking element restraining member and an outer peripheral surface of the inner body part. The pressure chamber is reduced in volume when the inner body part is displaced in the direction of the longitudinal axis relative to the outer body part and the locking element restraining member so that the locking element restraining member reaches the release position. The communication hole is formed in the inner body part to communicate between the pressure chamber and the female-side passage.

When a fluid pressure is applied into the female-side passage as a result of a pressure fluid being introduced into the flow path of the pipe coupling in a state where the female coupling member and the male coupling member are coupled together, the female coupling member and the male coupling member receive a force that urges the female and male coupling members to separate from each other so as to increase the volume in the female-side passage. Consequently, the inner body part receives a force that urges the locking element restraining member toward the release position. On the other hand, when a fluid pressure is applied into the pressure chamber, the inner body part receives a force in a direction in which the volume of the pressure chamber is increased, i.e. in a direction reverse to a direction in which the locking element restraining member is displaced to the release position. Accordingly, provision of the above-described pressure chamber enables cancellation of at least a part of force pressing the inner body part, which force is derived from the fluid pressure in the female-side passage, and it is possible to reduce a force acting on the inner body part in a direction in which the locking element restraining member is displaced to the release position. Thus, it is possible to prevent the female coupling member and the male coupling member from being decoupled from each other even if a higher fluid pressure is applied thereto.

More preferably, the arrangement may be such that the decrease in volume of the pressure chamber is substantially equal to the increase in volume of the female-side passage when the inner body part is displaced in the direction of the longitudinal axis relative to the outer body part and the locking element restraining member so that the locking element restraining member reaches the release position.

With the above-described arrangement, a force that the inner body part receives from the fluid pressure in the female-side passage and a reverse force that the inner body part receives from the fluid pressure in the pressure chamber become equal in magnitude to each other, and the inner body part cannot be displaced in the direction of the longitudinal axis by the fluid pressure. Thus, the female coupling member and the male coupling member are prevented from being decoupled from each other by the fluid pressure.

Specifically, the pressure chamber is formed between the inner peripheral surface of the locking element restraining member and the outer peripheral surface of the inner body part. The emergency detachable pipe coupling further includes a first sliding seal member, a second sliding seal member, and a third sliding seal member. The first sliding seal member is attached to one of the outer peripheral surface of the inner body part and the inner peripheral surface of the outer body part to sealingly engage the outer peripheral surface of the inner body part and the inner peripheral surface of the outer body part. The first sliding seal member has a first sliding engagement portion sliding in sealing engagement with the other of the outer peripheral surface of the inner body part and the inner peripheral surface of the outer body part. The second sliding seal member is attached to one of the outer peripheral surface of the inner body part and the inner peripheral surface of the locking element restraining member at the forward end of the pressure chamber to sealingly engage the outer peripheral surface of the inner body part and the inner peripheral surface of the locking element restraining member. The second sliding seal member has a second sliding engagement portion sliding in sealing engagement with the other of the outer peripheral surface of the inner body part and the inner peripheral surface of the locking element restraining member. The third sliding seal member is attached to one of the outer peripheral surface of the inner body part and the inner peripheral surface of the locking element restraining member at the rear end of the pressure chamber to sealingly engage the outer peripheral surface of the inner body part and the inner peripheral surface of the locking element restraining member. The third sliding seal member has a third sliding engagement portion sliding in sealing engagement with the other of the outer peripheral surface of the inner body part and the inner peripheral surface of the locking element restraining member. The area of a first virtual plane having an outer periphery defined by the first sliding engagement portion is substantially equal to an area obtained by subtracting the area of a second virtual plane having an outer periphery defined by the second sliding engagement portion from the area of a third virtual plane having an outer periphery defined by the third sliding engagement portion.

The emergency detachable pipe coupling according to the present invention may further include an auxiliary sleeve secured to the female coupling member so as to contact an outer peripheral surface thereof, the auxiliary sleeve extending forward of the female coupling member. The auxiliary sleeve is configured to extend to contact the outer peripheral surface of the male coupling member when coupled to the female coupling member, so that when the male coupling member is forced to tilt relative to the female coupling member, the auxiliary sleeve produces a force resisting tilting of the male coupling member.

The auxiliary sleeve acts to resist tilting of the male coupling member relative to the female coupling member, in cooperation with the urging member acting to resist the tilting. Accordingly, the urging force of the urging member can be reduced as compared to a structure in which the urging member resists the tilting by itself.

Embodiments of an emergency detachable pipe coupling according to the present invention will be explained below based on the accompanying drawings.

DETAILED DESCRIPTION OF THE INVENTION

Figure 1:
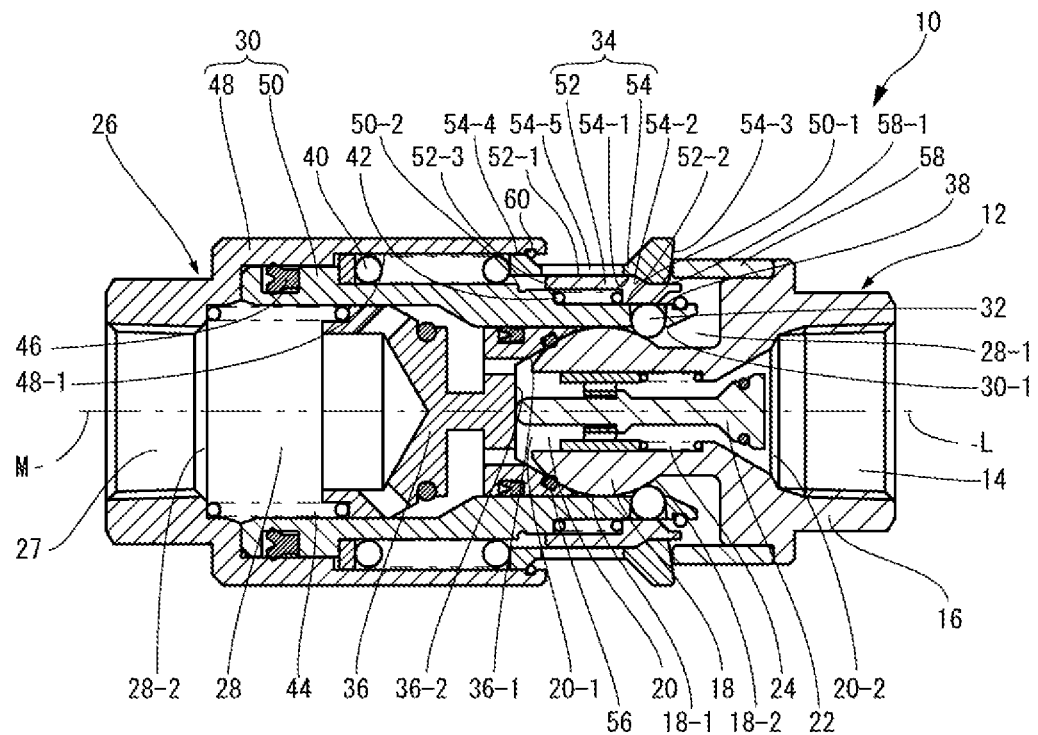
FIG. 1 is a diagram of an emergency detachable pipe coupling according to a first embodiment of the present invention, showing a coupled state of the emergency detachable pipe coupling.

As shown in FIG. 1, an emergency detachable pipe coupling 10 according to a first embodiment of the present invention comprises a male coupling member 12 and a female coupling member 26 having the male coupling member 12 coupled thereto. In the coupled state, a connecting end portion 18 of the male coupling member 12 is locked in a female-side passage 28 of the female coupling member 26 by a locking element 32 so that the male coupling member 12 cannot be detached from the female coupling member 26. When the male coupling member 12 is tilted relative to the female coupling member 26 in the above-described coupled state, the restraint by the locking element 32 is cancelled so that the male coupling member 12 and the female coupling member 26 are decouplable from each other. The structure of the emergency detachable pipe coupling 10 will be explained below in detail.

The male coupling member 12 has a base portion 16 having a piping connecting portion 14, a connecting end portion 18 extending from the base portion 16 to a forward end (left end as seen in the figure) of the male coupling member 12 and having a spherical surface 18-1, and a male-side passage 20 extending in the direction of a longitudinal axis L from a forward end opening 20-1 at the distal end of the connecting end portion 18 to a rear end opening 20-2 in the piping connecting portion 14. A male-side valve member 22 is disposed in the male-side passage 20. The male-side valve member 22 is displaceable between an open position (FIG. 1) where the male-side valve member 22 opens the male-side passage 20 and a closed position (FIG. 5) where the male-side valve member 22 closes the male-side passage 20. In addition, a male-side valve spring 24 is disposed in the male-side passage 20. The male-side valve spring 24 urges the male-side valve member 22 toward the closed position.

The female coupling member 26 includes a cylindrical female coupling body 30 formed with a female-side passage 28 extending in the direction of a longitudinal axis M from a forward end opening 28-1 to a rear end opening 28-2 in a piping connecting portion 27, a locking element 32 retained by the female coupling body 30, a locking element restraining member 34 fitted to the female coupling body 30 slidably in the direction of the longitudinal axis M, and a female-side valve member 36 disposed in the female-side passage 28. The locking element 32 is retained in a locking element retaining hole 38 formed in the female coupling body 30. The locking element 32 is displaceable between a locking position (FIG. 1) where the locking element 32 projects from an inner peripheral surface 30-1 of the female coupling body 30 to engage a locking element engaging surface 18-2 formed as a part of the spherical surface 18-1 of the connecting end portion 18 and an unlocking position (FIG. 4) where the locking element 32 is displaced radially outward of the female coupling body 30 from the locking position to disengage from the locking element engaging surface 18-2. The locking element restraining member 34 is displaceable in the direction of the longitudinal axis M between a restraining position (FIG. 1) where the locking element restraining member 34 engages the locking element 32 placed in the locking position from radially outside of the female coupling body 30 to restrain the locking element 32 in the locking position and a release position (FIGS. 3 and 4) where the locking element restraining member 34 retracts from the restraining position to allow the locking element 32 to be displaced to the unlocking position. The locking element restraining member 34 is urged forward in the direction of the longitudinal axis M toward the restraining position by an urging member comprising a main spring (first spring) 40 and an auxiliary spring (second spring) 42. The female-side valve member 36 is displaceable between an open position (FIG. 1) where the female-side valve member 36 opens the female-side passage 28 and a closed position (FIGS. 4 and 5) where the female-side valve member 36 closes the female-side passage 28. The female-side valve member 36 is urged toward the closed position by a female-side valve spring 44.

The female coupling body 30 comprises an outer body part 48 having the piping connecting portion 27, and an inner body part 50 disposed in the outer body part 48. The inner body part 50 is slidable relative to the outer body part 48 while sealing the area therebetween with a sliding seal member 46.

The locking element restraining member 34 comprises a cylindrical inner sleeve 52 slidably disposed over an outer peripheral surface 50-1 of the inner body part 50 of the female coupling body 30, and a cylindrical outer sleeve 54 disposed over an outer peripheral surface 52-1 of the inner sleeve 52 slidably relative to an inner peripheral surface 48-1 of the outer body part 48. The main spring 40 is engaged with the outer sleeve 54 to urge the outer sleeve 54 forward (rightward as seen in the figure), and the auxiliary spring 42 is engaged with the inner sleeve 52 to urge the inner sleeve 52 forward. The inner sleeve 52 has an inner tapered surface 52-2 formed on the outer peripheral surface 52-1, and the outer sleeve 54 has an outer tapered surface 54-2 formed on an inner peripheral surface 54-1 thereof. The outer tapered surface 54-2 abuts against the inner tapered surface 52-2 to limit the forward displacement of the inner sleeve 52. That is, the inner sleeve 52 is limited from being displaced forward beyond the coupled position shown in FIG. 1, and when the outer sleeve 54 is displaced rearward (leftward as seen in the figure), the inner sleeve 52 is displaced rearward together with the outer sleeve 54.

When the emergency detachable pipe coupling 10 is in the coupled state shown in FIG. 1, the connecting end portion 18 of the male coupling member 12 has been inserted in the female-side passage 28, and the spherical surface 18-1 of the connecting end portion 18 has engaged a conical seal surface 36-1 at the forward end of the female-side valve member 36, and thus the female-side valve member 36 has been pressed and displaced to the open position. In addition, the male-side valve member 22 has been displaced to the open position by being pressed in engagement with a forward end plane surface 36-2 of the female-side valve member 36. Accordingly, both the female-side passage 28 and the male-side passage 20 are open and in communication with each other. At this time, the locking element 32 is restrained in the locking position by the locking element restraining member 34 which is in the restraining position, and the locking element 32 is engaged with the locking element engaging surface 18-2 of the connecting end portion 18 to lock the male coupling member 12 from being detached from the female coupling member 26. In addition, the spherical surface 18-1 of the connecting end portion 18 and the conical seal surface 36-1 of the female-side valve member 36 are sealingly engaged with each other through an O-ring 56.

The male coupling member 12 has a cylindrical pressing member 58 secured to the base portion 16 such that the pressing member 58 projects in a direction in which the connecting end portion 18 projects. In the coupled state shown in FIG. 1, a pressing surface 58-1 at the distal end of the pressing member 58 is in close proximity to or contact with a to-be-pressed surface 54-3 at the forward end of the outer sleeve 54. Accordingly, when an external force of a magnitude greater than a given magnitude is not applied, the female coupling member 26 and the male coupling member 12 are held in a state where the longitudinal axis M and the longitudinal axis L are aligned in a straight line.

Figure 2:
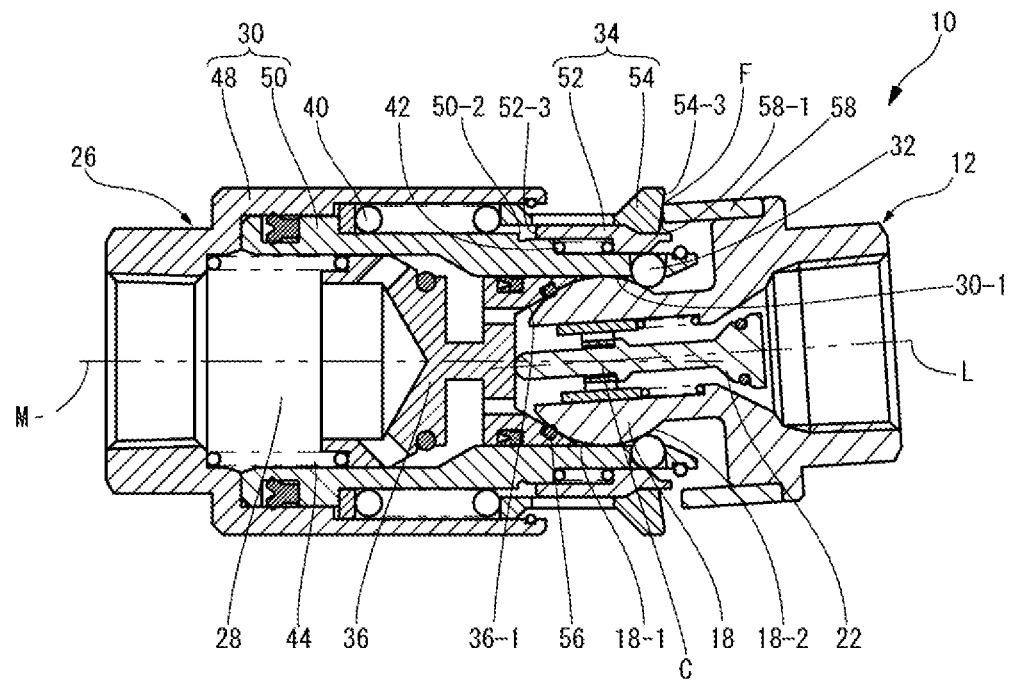
FIG. 2 is a diagram of the emergency detachable pipe coupling in FIG. 1, showing a state where a male coupling member is slightly tilted.
Figure 3:
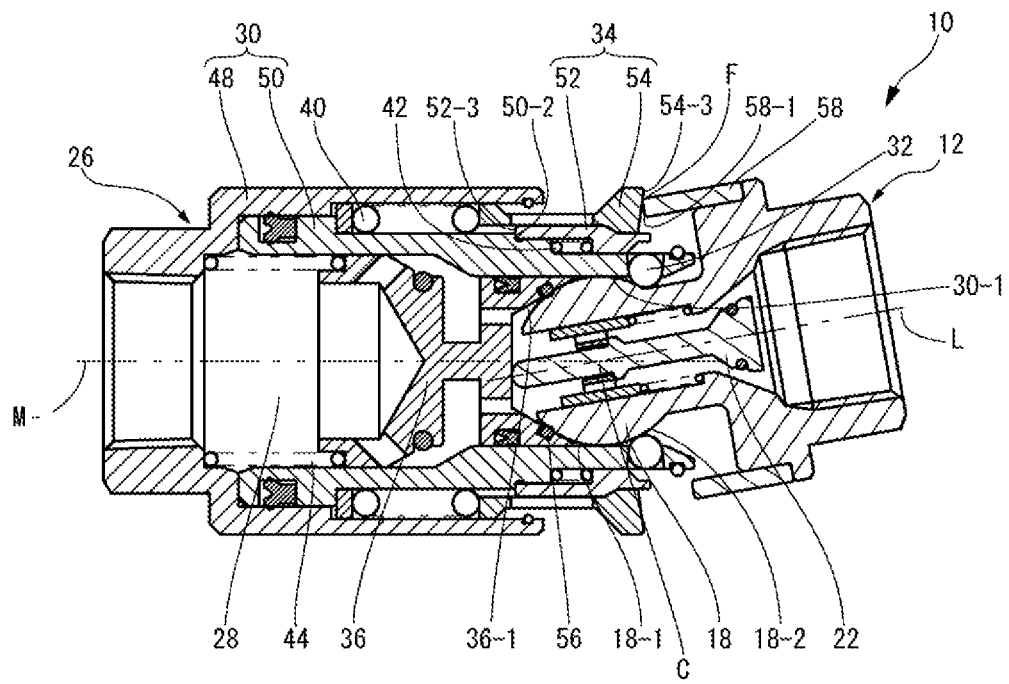
FIG. 3 is a diagram showing a state where the male coupling member has been further tilted from the position shown in FIG. 2, and a locking element restraining member has been displaced to a release position, so that a female coupling member and the male coupling member are decouplable from each other.
Figure 4:
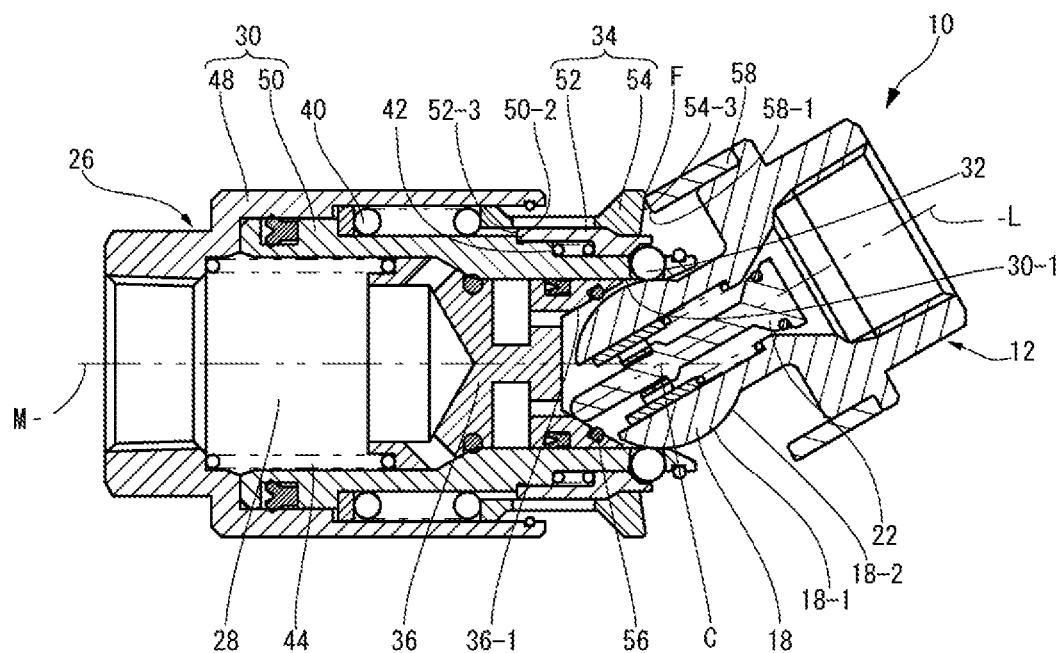
FIG. 4 is a diagram showing a state where the male coupling member has been further tilted from the position shown in FIG. 3 and a connecting end portion of the male coupling member has been displaced in a longitudinal direction of a female-side passage, resulting in a locking element being displaced to an unlocking position.
Figure 5:
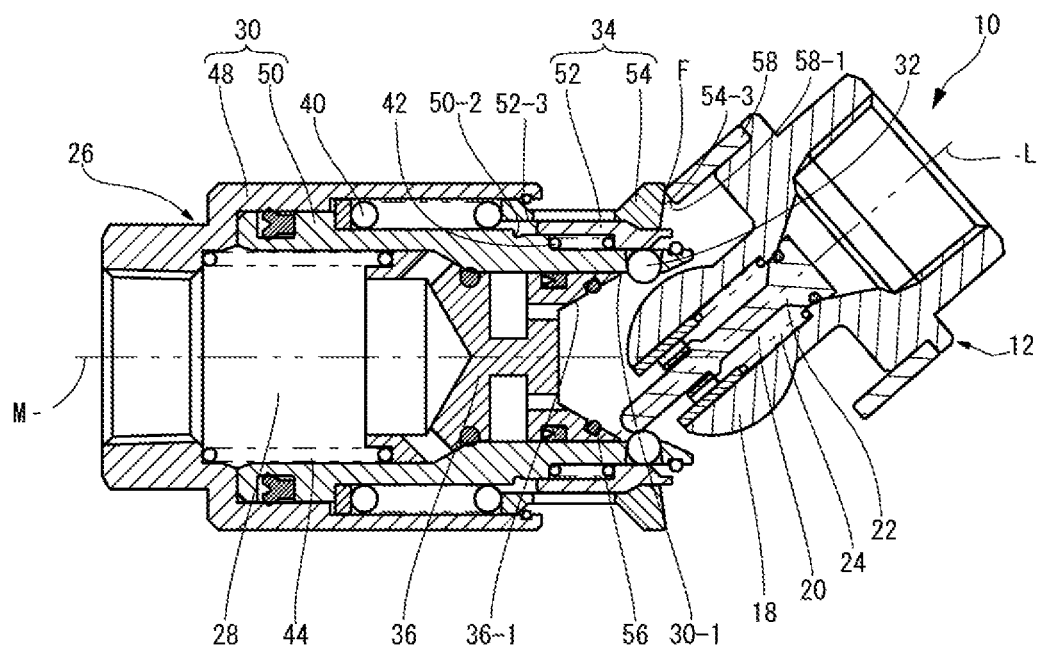
FIG. 5 is a diagram showing a state where the male coupling member has been further tilted from the position shown in FIG. 4, and, consequently, detached from the female coupling member.

In the coupled state shown in FIG. 1, when, for example, an external force of a magnitude greater than a given magnitude acts on pipings (not shown) connected to the male coupling member 12 and the female coupling member 26 such that the pipings are bent relative to each other, the male coupling member 12 begins to tilt relative to the female coupling member 26 in such a manner as to be inclined with respect to the longitudinal axis M (FIG. 2). At this time, the male coupling member 12 is tilted while the spherical surface 18-1 of the connecting end portion 18 is sliding relative to the locking element 32 and the inner peripheral surface 30-1 of the female coupling body 30, which constitutes the female-side passage 28, in a state where the spherical surface 18-1 is held in position by the inner peripheral surface 30-1 and the locking element 32. Accordingly, the male coupling member 12 rotates about the center C of curvature of the spherical surface 18-1. Further, at this time, the spherical surface 18-1 rotates while maintaining a state where the spherical surface 18-1 is sealingly engaged with the conical seal surface 36-1 through the O-ring 56. When the male coupling member 12 is tilted, the pressing surface 58-1 of the pressing member 58 presses the to-be-pressed surface 54-3 of the outer sleeve 54, causing the locking element restraining member 34, which comprises the outer sleeve 54 and the inner sleeve 52, to retract in the direction of the longitudinal axis M. When the male coupling member 12 is further tilted, the locking element restraining member 34 further retracts and is displaced to the release position (FIG. 3). Consequently, the locking element 32 becomes displaceable to the unlocking position, without being restrained in the locking position; therefore, the male coupling member 12 and the female coupling member 26 become decouplable from each other. At this time, a rear end surface 52-3 of the inner sleeve 52 engages a stop surface 50-2 of the inner body part 50 to stop the displacement of the locking element restraining member 34 in the direction of the longitudinal axis M. Consequently, when the male coupling member 12 is further tilted, the male coupling member 12 rotates about a fulcrum F defined by a point of engagement between the to-be-pressed surface 54-3 of the locking element restraining member 34, which has been stopped from displacement, and the pressing surface 58-1 of the male coupling member 12. Accordingly, the connecting end portion 18 gradually comes out of the female-side passage 28 (FIG. 4), and finally, the connecting end portion 18 completely comes out of the female-side passage 28, and the female coupling member 26 and the male coupling member 12 are completely decoupled from each other in a state where the female-side valve member 36 and the male-side valve member 22 are in their respective closed positions (FIG. 5). It should be noted that in the course of shifting from the state shown in FIG. 3 to the state shown in FIG. 5, the connecting end portion 18 is pressed in the direction of the longitudinal axis M by the female-side valve spring 44 through the female-side valve member 36, and, consequently, the male coupling member 12 receives an auxiliary force that further tilts and separates the male coupling member 12 from the female coupling member 26 in the direction of the longitudinal axis M. If the auxiliary force is increased by increasing the urging force of the female-side valve spring 44, the female coupling member 26 and the male coupling member 12 can be even more reliably detached from each other after the male and female coupling members 12 and 26 have become decouplable.

The to-be-pressed surface 54-3 formed on the outer sleeve 54 is inclined radially outward of the female coupling body 30 toward the pressing surface 58-1 of the male coupling member 12, i.e. forward in the direction of the longitudinal axis M. When the male coupling member 12 is tilted in a state where the connecting end portion 18 is in the female-side passage 28, the position of the connecting end portion 18 in the radial direction of the female coupling body 30 is restrained by the female-side passage 28; therefore, the male coupling member 12 moves in the direction of the longitudinal axis M while rotating about the center C of curvature of the spherical surface 18-1 of the connecting end portion 18. In the emergency detachable pipe coupling 10, when the female coupling member 26 and the male coupling member 12 are not decoupled, the to-be-pressed surface 54-3 is located forward (rightward as seen in the figures) in the direction of the longitudinal axis M relative to the center C of curvature, which is the center of rotation of the male coupling member 12. Therefore, as the male coupling member 12 is tilted, the fulcrum F, which is a point of contact between the to-be-pressed surface 54-3 and the pressing surface 58-1, gradually shifts outward along the to-be-pressed surface 54-3. Because the to-be-pressed surface 54-3 is inclined as stated above, the amount of displacement of the outer sleeve 54 due to the tilting of the male coupling member 12 is larger than in a case where the to-be-pressed surface 54-3 is not inclined by an amount corresponding to the amount of inclination. Accordingly, the locking element restraining member 34 can be displaced to the release position by tilting at a smaller angle.

Thus, in the emergency detachable pipe coupling 10 according to the present invention, when an external force of a magnitude greater than a given magnitude acts on the emergency detachable pipe coupling 10 such that the female coupling member 26 and the male coupling member 12 are tilted relative to each other, the locking element restraining member 34 is displaced to the release position to bring the female coupling member 26 and the male coupling member 12 into a decouplable state, and the female coupling member 26 and the male coupling member 12 are decoupled from each other.

Also, in the emergency detachable pipe coupling 10, when an external force of a magnitude greater than a given magnitude acts on the female coupling member 26 and the male coupling member 12, which are in a coupled state as shown in FIG. 1, such that the female coupling member 26 and the male coupling member 12 are forced to separate from each other in the direction of the longitudinal axis M, the female coupling member 26 and the male coupling member 12 are decoupled from each other as explained below.

Figure 6:
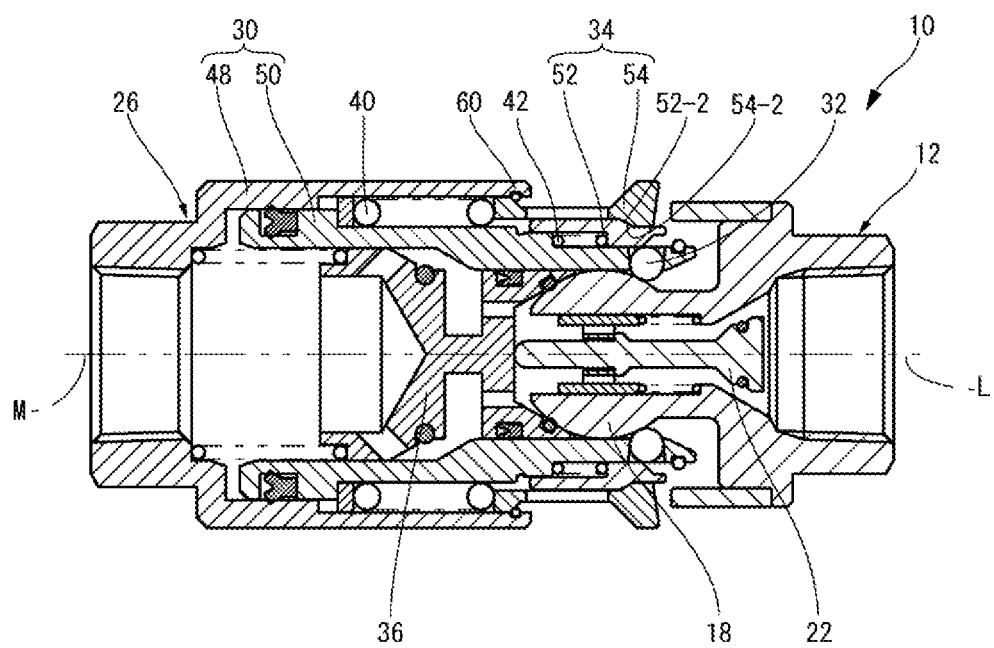
FIG. 6 is a diagram of the emergency detachable pipe coupling in FIG. 1, showing a state where the male coupling member has been slightly pulled in the direction of the longitudinal axis of the female-side passage.
Figure 7:
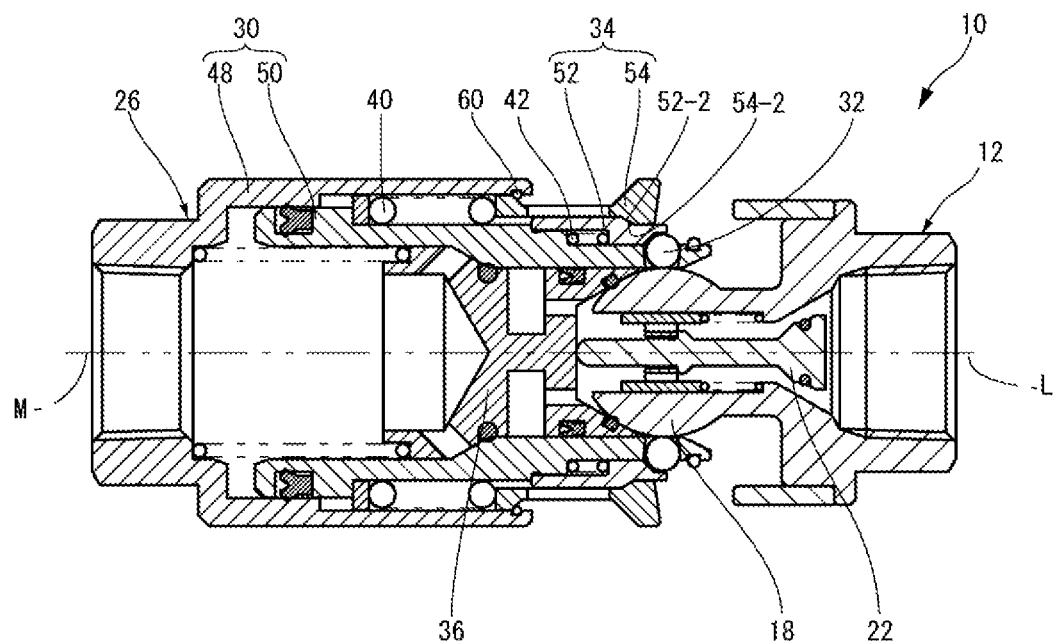
FIG. 7 is a diagram showing a state where the male coupling member has been further pulled from the position shown in FIG. 6, and the locking element restraining member has been displaced to the release position, so that the female coupling member and the male coupling member are decouplable from each other.

In the coupled state shown in FIG. 1, when the male coupling member 12 is pulled relative to the female coupling member 26 by an external force of a magnitude greater than a given magnitude away from the female coupling member 26 (rightward as seen in the figure) in the direction of the longitudinal axis M, the inner body part 50 of the female coupling member 26, which is connected to the connecting end portion 18 through the locking element 32, is also displaced together with the male coupling member 12 (FIG. 6). At this time, the locking element restraining member 34 cannot be displaced because the outer sleeve 54, which is a part of the locking element restraining member 34, is limited from being displaced forward by a snap ring 60 attached to the outer body part 48, and further because the inner sleeve 52 is also limited from being further displaced forward by engagement of the inner tapered surface 52-2 thereof with the outer tapered surface 54-2 of the outer sleeve 54. Accordingly, the locking element restraining member 34 retracts relative to the inner body part 50 displaced forward, and the main spring 40 and the auxiliary spring 42 set between the locking element restraining member 34 and the inner body part 50 are gradually compressed. When the male coupling member 12 is further pulled from the position shown in FIG. 6, the locking element restraining member 34 reaches the release position, so that the locking element 32 which has been restrained in the locking position becomes displaceable to the unlocking position. Consequently, the connecting end portion 18 is displaced while pushing away the locking element 32 (FIG. 7), and the female coupling member 26 and the male coupling member 12 are completely decoupled from each other, with the female-side valve member 36 and the male-side valve member 22 placed in their respective closed positions (FIG. 8).

Figure 8:
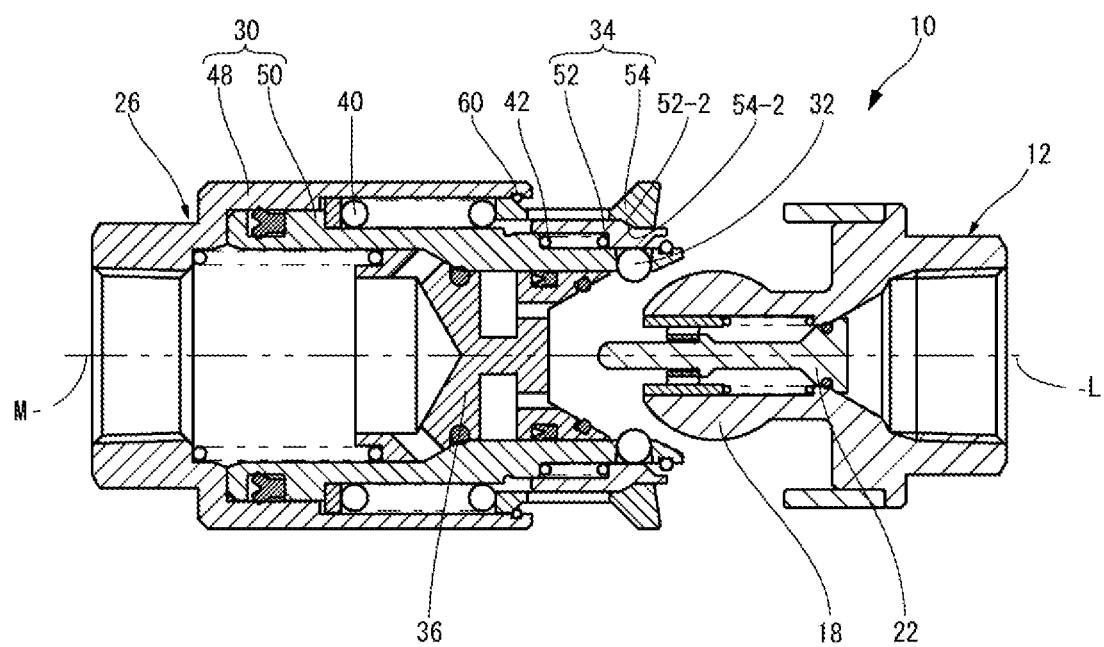
FIG. 8 is a diagram showing a state where the male coupling member has been further pulled from the position shown in FIG. 7, and, consequently, detached from the female coupling member.
Figure 9:
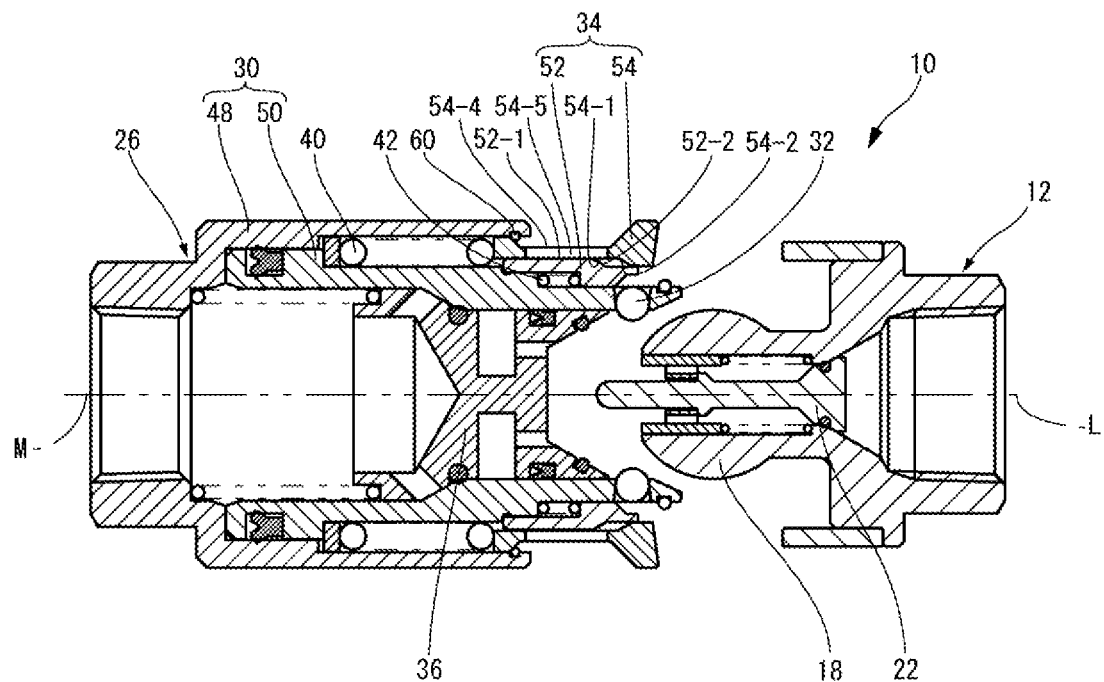
FIG. 9 is a diagram of the emergency detachable pipe coupling in FIG. 1 in an uncoupled state, showing the way in which an inner sleeve of the locking element restraining member is retracted to allow the female coupling member and the male coupling member to be coupled together.
Figure 10:
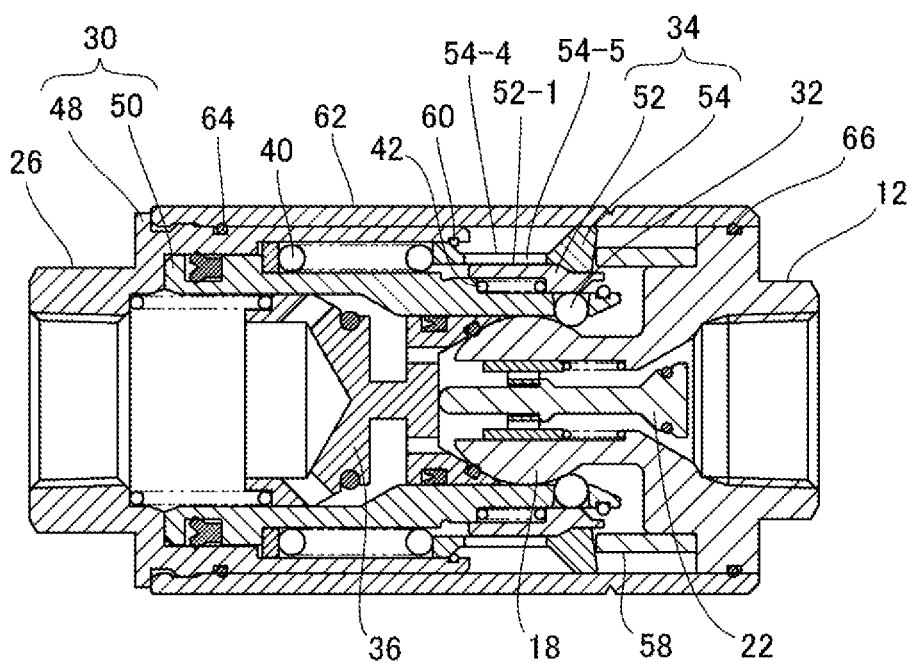
FIG. 10 is a diagram of an emergency detachable pipe coupling according to a second embodiment of the present invention.

In a state where the female coupling member 26 and the male coupling member 12 are completely decoupled from each other, as shown in FIGS. 5 and 8, the locking element restraining member 34 is placed in the restraining position, and the locking element 32 is restrained in the locking position by the locking element restraining member 34. Therefore, in order to couple together the male coupling member 12 and the female coupling member 26 which are in the decoupled state, it is necessary to bring the locking element 32 into a state where the locking element 32 is displaceable to the unlocking position. At this time, the locking element restraining member 34 may be displaced to the release position by pressing the outer sleeve 54, together with the inner sleeve 52, against the urging force of the main and auxiliary springs 40 and 42. However, because the main spring 40 usually has a very strong urging force as compared to the power of the human hand, a great deal of effort is required for an operation of compressing the main spring 40. In the emergency detachable pipe coupling 10, the outer sleeve 54 has a plurality of openings 54-5 formed therein to extend therethrough from an outer peripheral surface 54-4 to inner peripheral surface 54-1 thereof. Accordingly, a part of the outer peripheral surface 52-1 of the inner sleeve 52 is exposed through the openings 54-5, and the inner sleeve 52 can be directly manipulated through the openings 54-5. That is, as shown in FIG. 9, the locking element 32 can be brought into a state where the locking element 32 is displaceable to the unlocking position by retracting only the inner sleeve 52 without displacing the outer sleeve 54. The auxiliary spring 42, which presses the inner sleeve 52, only needs to have an urging force necessary for displacing the inner sleeve 52 to a position where the inner sleeve 52 engages the outer sleeve 54 in the direction of the longitudinal axis M. Accordingly, the urging force of the auxiliary spring 42 is usually set much smaller than the urging force of the main spring 40. Therefore, no great force is needed to retract only the inner sleeve 52 against the urging force of the auxiliary spring 42, and the operator can easily perform the coupling operation.

FIGS. 10 to 13 show an emergency detachable pipe coupling 10 according to a second embodiment of the present invention. The emergency detachable pipe coupling 10 has the same basic structure as that of the above-described first embodiment; therefore, the same constituent elements as those of the first embodiment are described by using the same technical terms and denoted by the same reference numerals as those used in the first embodiment.

In the emergency detachable pipe coupling 10, as illustrated in the figures, the outer body part 48 of the female coupling body 30 has an auxiliary sleeve 62 concentrically secured to the outer peripheral surface of the outer body part 48. The auxiliary sleeve 62 extends forward beyond the outer body part 48. When the male coupling member 12 has been inserted into and coupled to the female coupling member 26, a seal ring 64 provided on the outer peripheral surface of the female coupling body 30 and a seal ring 66 provided on the outer peripheral surface of the male coupling member 12 sealingly engage the inner peripheral surface of the auxiliary sleeve 62 at near the rear and forward ends, respectively, of the auxiliary sleeve 62 to prevent dust from entering the interior of the emergency detachable pipe coupling 10. The auxiliary sleeve 62 is formed to have a certain degree of rigidity by using rigid polyvinyl chloride or the like so as to offer resistance to the relative tilting between the male coupling member 12 and the female coupling member 26.

The emergency detachable pipe couplings 10 according to the present invention including the second embodiment and the above-described first embodiment are characterized in that when an external force is applied to the emergency detachable pipe coupling 10 such that the male coupling member 12 and the female coupling member 26 are tilted relative to each other, the emergency detachable pipe coupling 10 allows relative tilting between the two coupling members 12 and 26 caused by the external force and enables the male coupling member 12 and the female coupling member 26 to detach from each other. In this regard, the arrangement must be such that the male and female coupling members 12 and 26 do not detach from each other until the external force exceeds a given magnitude. In order to realize such an arrangement, it is necessary for the main spring 40 to have a spring force of a magnitude greater than a given magnitude. In large-sized piping such as plant piping, in particular, a large moment is likely to act on a joint in the piping; therefore, the spring force also needs to be increased. However, if the spring force is large, the inner body part 50 becomes difficult to displace even if such an external force acts on the male coupling member 12 that urges the male coupling member 12 to separate from the female coupling member 26 in the direction of the longitudinal axis M, as has been explained based on FIGS. 6 to 9. Accordingly, the force needed to decouple the male coupling member 12 and the female coupling member 26 at that time may increase undesirably, so that it may be impossible to decouple the male and female coupling members 12 and 26 properly in the direction of the longitudinal axis M.

In the second embodiment, the auxiliary sleeve 62 is made rigid, so that the auxiliary sleeve 62 also acts to resist the female coupling member 26 and the male coupling member 12 from tilting relative to each other in addition to the main spring 40. Accordingly, in the second embodiment, the spring force of the main spring 40 can be reduced as compared to the first embodiment, in which resistance is applied to tilting between the female coupling member 26 and the male coupling member 12 only by the spring force of the main spring 40. Consequently, the main spring 40 enables detachment between the male coupling member 12 and the female coupling member 26 in the direction of the longitudinal axis M to take place with an external force of an appropriate magnitude, and the rigidity of the auxiliary sleeve 62 enables detachment between the male coupling member 12 and the female coupling member 26 by tilting to take place with an external force of an appropriate magnitude.

Figure 11:
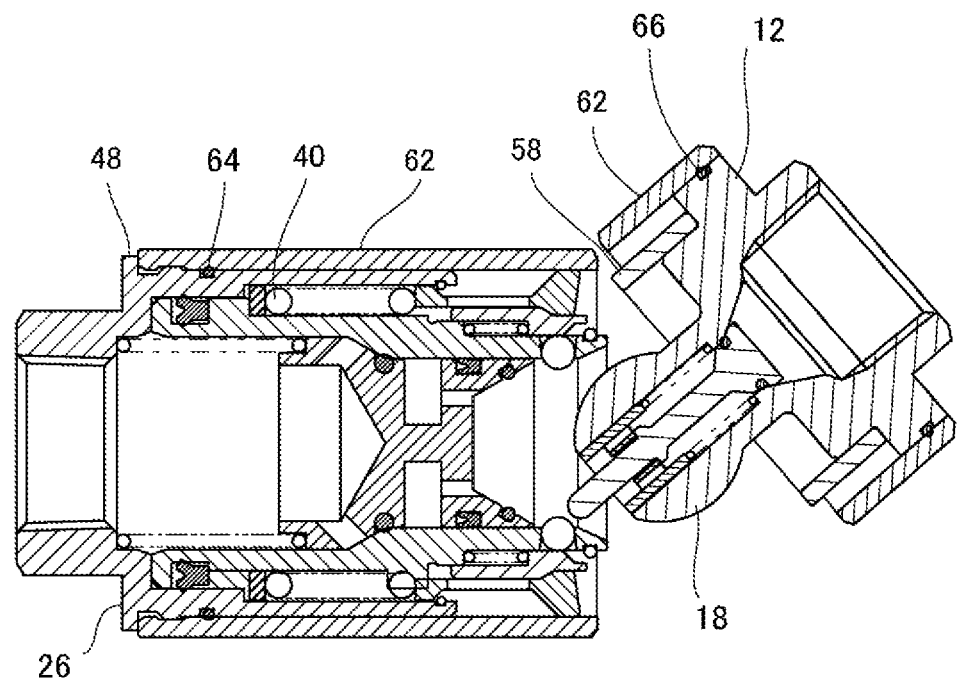
FIG. 11 is a diagram of the emergency detachable pipe coupling in FIG. 10, showing a state where a male coupling member has been tilted, and, consequently, detached from a female coupling member.
Figure 12:
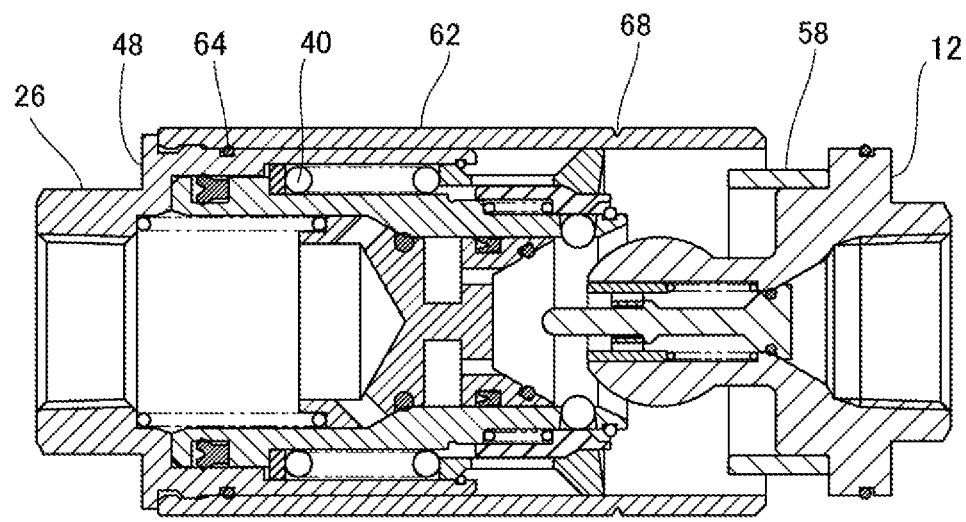
FIG. 12 is a diagram of the emergency detachable pipe coupling in FIG. 10, showing a state where the male coupling member has been pulled in the direction of a longitudinal axis of a female-side passage, and, consequently, detached from the female coupling member.
Figure 13:
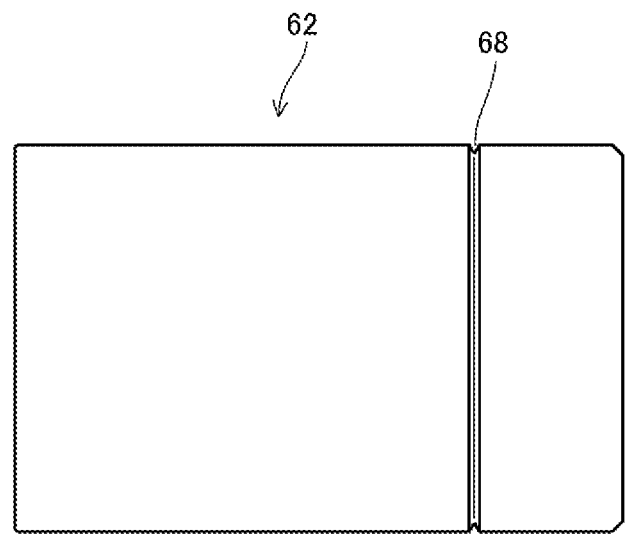
FIG. 13 is a side view of an auxiliary sleeve of the emergency detachable pipe coupling shown in FIG. 10, showing the way in which a circumferentially extending slit is formed on an outer peripheral surface of the auxiliary sleeve.

As shown particularly clearly in FIG. 13, the auxiliary sleeve 62 has a circumferentially extending slit 68 provided on an outer peripheral surface thereof. When an external force of a magnitude greater than a given magnitude is applied to the female coupling member 26 and the male coupling member 12 such that the female and male coupling members 26 and 12 are tilted relative to each other, the auxiliary sleeve 62 is broken along the slit 68, thereby allowing decoupling due to tiling to take place. FIG. 11 shows the male coupling member 12 and the female coupling member 26 decoupled from each other as stated above. FIG. 12 shows the male coupling member 12 and the female coupling member 26 decoupled from each other by a pulling force applied in the longitudinal axis direction.

Figure 14:
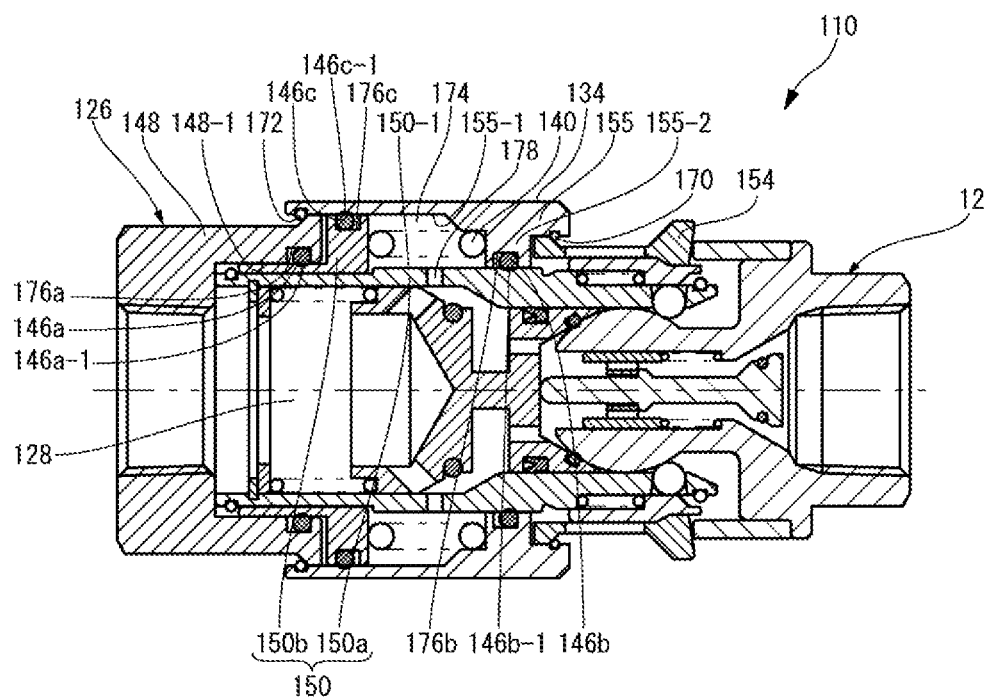
FIG. 14 is a diagram of an emergency detachable pipe coupling according to a third embodiment of the present invention, showing the emergency detachable pipe coupling in a coupled state.

FIG. 14 shows an emergency detachable pipe coupling 110 according to a third embodiment of the present invention. In the emergency detachable pipe coupling 110, a locking element restraining member 134 of a female coupling member 126 further has an extension sleeve 155 holding an outer sleeve 154. The extension sleeve 155 holds the outer sleeve 154 by a snap ring 170 provided at a forward end thereof. Thus, the extension sleeve 155 is substantially integrated with the outer sleeve 154. Further, the extension sleeve 155 is engaged with an outer body part 148 through another snap ring 172 provided at a rear end thereof, whereby the extension sleeve 155 is limited from being further displaced rightward from the position shown in FIG. 14. A pressure chamber 174 (described later) is formed between an outer peripheral surface 150-1 of an inner body part 150 and an inner peripheral surface 155-1 of the extension sleeve 155 of the locking element restraining member 134. The male coupling member 12 is the same as that in the first embodiment. It should be noted that the inner body part 150 comprises two members, i.e. a first inner body part 150a and a second inner body part 150b secured to the outer side of the first inner body part 150a. The first and second inner body parts 150a and 150b may, however, be formed as one integral member.

The outer body part 148 has a first seal member accommodating groove 176a formed in an inner peripheral surface 148-1 thereof. The outer peripheral surface 150-1 of the inner body part 150 and the inner peripheral surface 148-1 of the outer body part 148 are sealingly engaged with each other through a first sliding seal member 146a fitted in the first seal member accommodating groove 176a. The extension sleeve 155 has a second seal member accommodating groove 176b formed in an inner peripheral surface 155-1 thereof at an inwardly projecting portion 155-2 thereof. The outer peripheral surface 150-1 of the inner body part 150 and the inner peripheral surface 155-1 of the extension sleeve 155 are sealingly engaged with each other through a second sliding seal member 146b fitted in the second seal member accommodating groove 176b. Further, the inner body part 150 has a third seal member accommodating groove 176c formed in the outer peripheral surface 150-1 thereof at the second inner body part 150b. The outer peripheral surface 150-1 of the inner body part 150 and the inner peripheral surface 155-1 of the extension sleeve 155 are sealingly engaged with each other through a third sliding seal member 146c fitted in the third seal member accommodating groove 176c. When the inner body part 150 is displaced in the direction of the longitudinal axis M relative to the outer body part 148, a first sliding engagement portion 146a-1 defined by an inner peripheral portion of the first sliding seal member 146a slides in sealing engagement with the outer peripheral surface 150-1 of the inner body part 150. Similarly, a second sliding engagement portion 146b-1 defined by an inner peripheral portion of the second sliding seal member 146b slides in sealing engagement with the outer peripheral surface 150-1 of the inner body part 150, and a third sliding engagement portion 146c-1 defined by an outer peripheral portion of the third sliding seal member 146c slides in sealing engagement with the inner peripheral surface 155-1 of the extension sleeve 155.

A pressure chamber 174 is formed between the inner peripheral surface 155-1 of the extension sleeve 155 of the locking element restraining member 134 and the outer peripheral surface 150-1 of the inner body part 150. The pressure chamber 174 is sealed at its forward end by the second sliding seal member 146b and at its rear end by the third sliding seal member 146c. A main spring 140 is disposed in the pressure chamber 174 to urge the extension sleeve 155 and the inner body part 150 away from each other. Further, the inner body part 150 is provided with a communication hole 178 communicating between the pressure chamber 174 and a female-side passage 128 to make the fluid pressure in the pressure chamber 174 substantially equal to the fluid pressure in the female-side passage 128. The pressure chamber 174 is configured to decrease in volume as the inner body part 150 is displaced rightward. Accordingly, when a fluid pressure is applied to the interior of the pressure chamber 174, the inner body part 150 receives a force that moves the inner body part 150 leftward relative to the extension sleeve 155 and the outer body part 148.

In this regard, in the emergency detachable pipe coupling 10 (FIG. 1) according to the first embodiment, which does not have a pressure chamber 174 as in this embodiment, when a fluid pressure is applied to the interior of the female-side passage 28, the inner body part 50 and the male coupling member 12 inserted into the female-side passage 28 receive such a pressing force that displaces the inner body part 50 and the male coupling member 12 along the direction of the longitudinal axis M in a direction for increasing the volume of the female-side passage 28. When the inner body part 50 and the male coupling member 12 are displaced rightward, the female-side passage 28 extends in the direction of the longitudinal axis M by an amount equal to the displacement of the inner body part 50 and the male coupling member 12, and the volume of the female-side passage 28 increases correspondingly. Therefore, the inner body part 50 and the male coupling member 12 receive a force urging these members rightward along the longitudinal axis M. Because the male coupling member 12 is locked to the inner body part 50 by the locking element 32, the force that the male coupling member 12 receives is received by the inner body part 50, and the force is finally received by the main spring 40 and the auxiliary spring 42. As the fluid pressure in the female-side passage 28 increases and, consequently, the force that the inner body part 50 receives becomes greater than the magnitude of the combined urging force of the main spring 40 and the auxiliary spring 42, the main and auxiliary springs 40 and 42 begin to be compressed, and the inner body part 50 is displaced rightward, together with the male coupling member 12, to reach a state similar to that shown in FIG. 6. As the fluid pressure further increases, the inner body part 50 and the male coupling member 12 are further displaced rightward, and the locking element restraining member 34 reaches the release position. As a result, the locking element 32, which has been restrained in the locking position, becomes displaceable to the unlocking position. Consequently, the male coupling member 12 and the female coupling member 26 are decoupled from each other to reach a state similar to that shown in FIG. 7. That is, when the fluid pressure becomes excessively high in comparison to the urging force of the main and auxiliary springs 40 and 42, the male coupling member 12 and the female coupling member 26 are undesirably decoupled from each other. Even when the fluid pressure is not so high as to decouple the two coupling members, the following problem may arise. That is, the magnitude of force by which the inner body part 50 is pressed rightward varies according to the magnitude of the fluid pressure. Therefore, the magnitude of external force at which the male coupling member 12 and the female coupling member 26 are decoupled from each other when the male coupling member 12 is pulled relative to the female coupling member 26 away from the latter (rightward as seen in the figures) in the direction of the longitudinal axis M varies according to the magnitude of the fluid pressure. In other words, the magnitude of external force in the direction of the longitudinal axis M needed to decouple the male and female coupling members 12 and 26 is not constant. It should be noted that the force that the inner body part 50 receives from the fluid pressure in the female-side passage 28 (including the force that the inner body part 50 receives indirectly from the male coupling member 12) has a magnitude obtained by multiplying together the fluid pressure and the area of a virtual circle having an outer circumference defined by a portion of the inner body part 50 that slides relative to the outer body part 48, i.e. the outer peripheral portion of the sliding seal member 46.

In the emergency detachable pipe coupling 110 according to this embodiment, the pressure chamber 174 is provided as stated above, and the fluid pressure in the pressure chamber 174 applies a leftward pressing force to the inner body part 150. That is, the inner body part 150 receives a rightward pressing force applied by the fluid pressure in the female-side passage 128 and also receives a leftward pressing force applied by the fluid pressure in the pressure chamber 174. Accordingly, the resultant force acting on the inner body part 150 decreases by an amount corresponding to the leftward pressing force applied by the fluid pressure in the pressure chamber 174. Therefore, decoupling due to the fluid pressure is unlikely to occur or will not occur. When a fluid pressure is applied to the female-side passage 128 and the pressure chamber 174, which is communicated with the female-side passage 128 through the communication hole 178, the inner body part 150 and the male coupling member 12 are forced to be displaced in a direction in which the total volume of the female-side passage 128 and the pressure chamber 174 increases. Accordingly, if the decrease in volume of the pressure chamber 174 when the inner body part 150 is displaced rightward by a predetermined distance becomes equal to the increase in volume of the female-side passage 128, even if the inner body part 150 is displaced leftward or rightward in the direction of the longitudinal axis M, there is no change in the total volume of the area filled with the fluid, and the inner body part 150 will not be displaced leftward or rightward by the fluid pressure. If the arrangement is such that the decrease in volume of the pressure chamber 174 becomes larger than the increase in volume of the female-side passage 128, the inner body part 150 is pressed leftward by the fluid pressure, so that the higher the fluid pressure, the greater the external force needed to pull out the male coupling member 12.

The pressing force applied by the fluid pressure will be examined in more detail below. First, the magnitude of a rightward force $F_r$ that the inner body part 150 receives from the fluid pressure P in the female-side passage 128 is a value obtained by multiplying together the fluid pressure P and the area $A_1$ of a virtual circle (first virtual plane) $R_1$ having an outer circumference defined by the first sliding engagement portion 146a-1, which is a point at which the inner body part 150 is in sliding contact with the outer body part 148. That is, $F_r = A_1 P$. Next, a plane that contributes for the fluid pressure P in the pressure chamber 174 to apply a leftward force $F_1$ to the inner body part 150 is a plane of an annular area between the third sliding engagement portion 146c-1 and the second sliding engagement portion 146b-1 as seen in the radial direction. Accordingly, the magnitude of the leftward force $F_1$ that the inner body part 150 receives from the fluid pressure P in the pressure chamber 174 is a value obtained by multiplying together the fluid pressure P and an area $A_{3-2} (=A_3-A_2)$ obtained by subtracting the area $A_2$ of a virtual circle $R_2$ (second virtual plane) having an outer circumference defined by the second sliding engagement portion 146b-1 from the area $A_3$ of a virtual circle $R_3$ (third virtual plane) having an outer circumference defined by the third sliding engagement portion 146c-1. That is, $F_1 = A_{3-2} P$. Consequently, the magnitude of the rightward force F that the inner body part 150 receives from the fluid pressure P in the female-side passage 128 and the pressure chamber 174 is as follows: $F = F_r - F_1 = A_1 P - A_{3-2} P$. That is, by providing the pressure chamber 174, the rightward force F that the inner body part 150 receives from the fluid pressure is reduced by $A_{3-2} P$. The size of $A_{3-2}$ can be designed at will by appropriately setting the respective positions of the second and third sliding engagement portions 146b-1 and 146c-1 in the radial direction. In the embodiment shown in FIG. 14, the respective radial positions of the second and third sliding engagement portions 146b-1 and 146c-1 are set so that the area $A_{3-2}$ that contributes to pressing the inner body part 150 leftward is equal to the area $A_1$ contributing to pressing the same rightward. By so doing, the rightward force $F_r$ and the leftward force $F_1$ that act on the inner body part 150 are canceled by each other, i.e. F=0, and the inner body part 150 will not be displaced in the direction of the longitudinal axis M by the fluid pressure P. Thus, the female coupling member 126 and the male coupling member 12 cannot be decoupled from each other by the fluid pressure, and the magnitude of external force at which the female coupling member 126 and the male coupling member 12 are decoupled by the external force becomes constant regardless of the fluid pressure. It should be noted that making the area $A_1$ and the area $A_{3\text{-}2}$ equal to each other is nothing but equalizing the increase in volume of the female-side passage 128 and the decrease in volume of the pressure chamber 174 when the inner body part 150 is displaced rightward by a predetermined distance.

In this embodiment, the outer portion of the pressure chamber 174 is formed by the extension sleeve 155, which is a part of the locking element restraining member 134, but may be formed by the outer body part 148 or a combination of the outer body part 148 and the extension sleeve 155. Further, to which of the mutually sliding members the first to third sliding seal members 146a to 146c are to be attached is a freely designable matter. For example, the first sliding seal member 146a may be attached not to the outer body part 148 but to the inner body part 150 so as to slide relative to the outer body part 148.

Although some embodiments of the present invention have been explained above, the present invention is not limited to these embodiments. For example, in the foregoing embodiment, when an external force is applied such that the male coupling member 12 and the female coupling member 26 are tilted, first, tilting occurs about the center of curvature of the spherical surface 18-1 of the connecting end portion 18, and when, as shown in FIG. 3, the rear end surface 52-3 of the inner sleeve 52 engages the stop surface 50-2 of the inner body part 50 to stop the displacement of the locking element restraining member 34 in the direction of the longitudinal axis M, the male coupling member 12 rotates about the fulcrum F defined by the point of engagement between the to-be-pressed surface 54-3 of the locking element restraining member 34, which has been stopped from displacement, and the pressing surface 58-1 of the male coupling member 12, thereby allowing the connecting end portion 18 to gradually come out of the female-side passage 28 (FIG. 4) and finally to completely come out thereof (FIG. 5). However, if the female-side valve spring 44 is configured to have a spring force of appropriate magnitude, the male coupling member 12 can be pushed out of the female coupling member 26 by the female-side valve spring 44 when the locking element restraining member 34 reaches the release position (FIG. 3). Further, although the locking element engaging surface 18-2 is formed by a part of the spherical surface 18-1, the locking element engaging surface 18-2 need not necessarily be spherical but may be a conically tapered surface, for example. Further, the pressing member 58 and the outer sleeve 54 are both cylindrical, and the pressing surface 58-1 and the to-be-pressed surface 54-3 are both ring-shaped surfaces; therefore, no matter in which direction the male coupling member 12 is tilted, the pressing surface 58-1 and the to-be-pressed surface 54-3 contact each other, and the male coupling member 12 and the female coupling member 26 are decoupled as stated above. However, the male and female coupling members 12 and 26 may be configured to decouple from each other only when the male coupling member 12 is tilted in an optional direction, for example, by providing at least one of the pressing surface 58-1 and the to-be-pressed surface 54-3 only in a horizontal plane so that the male and female coupling members 12 and 26 are decoupled only when the male coupling member 12 is tilted in the horizontal plane of the emergency detachable pipe coupling as installed but not decoupled when the male coupling member 12 is tilted in the vertical direction thereof. Further, although the male coupling member 12 is configured to be tiltable in any direction thanks to the fact that the connecting end portion 18 thereof has the spherical surface 18-1, the direction in which the male coupling member 12 is tiltable may be limited, for example, by allowing the connecting end portion 18 to have an arcuate surface centered at a transverse axis perpendicular to the longitudinal axis M of the female-side passage 28 so that the male coupling member 12 is tiltable only about the transverse axis.

Further, although in the foregoing embodiment the male coupling member 12 and the female coupling member 26 have the valve members 22 and 36, respectively, one or both of the valve members 22 and 36 may be omitted, provided that leakage of the internal fluid to the outside is not a very severe problem. Further, although the locking element restraining member 34 has a structure comprising the inner sleeve 52 and the outer sleeve 54 so that the female coupling member 26 and the male coupling member 12 can be coupled together easily, the locking element restraining member 34 may have an integral structure if such a function is not necessary. In such a case, the locking element restraining member 34 may comprise a single member, not two discrete members. Further, although the female coupling body 30 has a structure comprising the inner body part 50 and the outer body part 48 so that the female coupling member 26 and the male coupling member 12 can also be decoupled by an external force of a magnitude greater than a given magnitude applied in the direction of the longitudinal axis M, the female coupling body 30 may comprise an integral member if such a function is not necessary. Further, although in the male coupling member 12 the pressing member 58 constituting the pressing surface 58-1 is a member discrete from the base portion 16, the base portion 16 and the pressing member 58 may be formed as an integral member. Alternatively, the locking element restraining member 34 may be further extended so that the to-be-pressed surface 54-3 thereof directly contacts the base portion 16, thereby eliminating the need for the pressing member 58.

LIST OF REFERENCE SIGNS

Emergency detachable pipe coupling 10; male coupling member 12; piping connecting portion 14; base portion 16; connecting end portion 18; spherical surface 18-1; locking element engaging surface 18-2; male-side passage 20; forward end opening 20-1; rear end opening 20-2; male-side valve member 22; male-side valve spring 24; female coupling member 26; piping connecting portion 27; female-side passage 28; forward end opening 28-1; rear end opening 28-2; female coupling body 30; inner peripheral surface 30-1; locking element 32; locking element restraining member 34; female-side valve member 36; conical seal surface 36-1; forward end plane surface 36-2; locking element retaining hole 38; main spring (first spring) 40; auxiliary spring (second spring) 42; female-side valve spring 44; sliding seal member 46; outer body part 48; inner peripheral surface 48-1; inner body part 50; outer peripheral surface 50-1; stop surface 50-2; inner sleeve 52; outer peripheral surface 52-1; inner tapered surface 52-2; rear end surface 52-3; outer sleeve 54; inner peripheral surface 54-1; outer tapered surface 54-2; to-be-pressed surface 54-3; outer peripheral surface 54-4; openings 54-5; O-ring 56; pressing member 58; pressing surface 58-1; snap ring 60; auxiliary sleeve 62; seal ring 64, 66; slit 68; emergency detachable pipe coupling 110; female coupling member 126; female-side passage 128; locking element restraining member 134; main spring 140; first sliding seal member 146a; first sliding engagement portion 146a-1; second sliding seal member 146b; second sliding engagement portion 146b-1; third sliding seal member 146c; third sliding engagement portion 146c-1; outer body part 148; inner peripheral surface 148-1; inner body part 150; outer peripheral surface 150-1; inwardly projecting portion 155-2; first inner body part 150a; second inner body part 150b; outer sleeve 154; extension sleeve 155; inner peripheral surface 155-1; snap ring 170; snap ring 172; pressure chamber 174; first seal member accommodating groove 176a; second seal member accommodating groove 176b; third seal member accommodating groove 176c; communication hole 178; longitudinal axis L; longitudinal axis M; center C of curvature; fulcrum F.

The invention claimed is:

1. An emergency detachable pipe coupling comprising:
a female coupling member having a female-side passage extending from a forward end opening to a rear end opening; and
a male coupling member having a male-side passage extending from a forward end opening to a rear end opening and further having a connecting end portion at a forward end thereof, the male coupling member being configured to be coupled to the female coupling member with the connecting end portion inserted into the female-side passage from the forward end opening of the female coupling member such that the male-side passage and the female-side passage communicate with each other;
wherein the female coupling member includes:
a cylindrical female coupling body having the female-side passage;
a locking element retained by the female coupling body displaceably between a locking position, where the locking element projects from an inner peripheral surface of the female coupling body to engage a locking element engaging surface of the male coupling member to thereby lock the male coupling member, and an unlocking position, where the locking element is displaced radially outward of the female coupling body from the locking position to disengage from the locking element engaging surface;
a locking element restraining member attached to the female coupling body displaceably relative to the locking element between a restraining position where the locking element restraining member restrains the locking element in the locking position and a release position where the locking element restraining member allows the locking element to be displaced to the unlocking position; and
an urging member disposed between the female coupling body and the locking element restraining member to urge the locking element restraining member toward the restraining position;
wherein the male coupling member has a pressing surface, and the locking element restraining member has a to-be-pressed surface to be engaged and pressed by the pressing surface;
wherein, when the female coupling member and the male coupling member are in a coupled state, the male coupling member is tiltable relative to a longitudinal axis of the female-side passage, and when the male coupling member is tilted at a predetermined angle, the pressing surface presses the to-be-pressed surface, causing the locking element restraining member to be displaced to the release position, and allowing the connecting end portion of the male coupling member to come out of the female coupling member;
wherein the locking element restraining member is displaceable between the restraining position and the release position in a direction of the longitudinal axis of the female-side passage;
wherein the connecting end portion has a spherical surface and rotates about a center of curvature of the spherical surface when the male coupling member is tilted until the locking element restraining member reaches the release position;
wherein the female coupling member further includes a female-side valve member displaceable between a closed position, in which the female-side valve member closes the female-side passage, and an open position, in which the female-side valve member opens the female-side passage, and a female-side valve urging member urging the female-side valve member toward the closed position, the female-side valve member having a conical seal surface engageable with the spherical surface of the connecting end portion; and
wherein, when the connecting end portion of the male coupling member is inserted into the female-side passage, the spherical surface of the connecting end portion engages the conical seal surface of the female-side valve member, and when the connecting end portion is further inserted such that the male coupling member is coupled to the female coupling member, the female-side valve member is displaced to the open position to make the male-side passage and the female-side passage communicate with each other, and when the male coupling member is tilted in a state in which the male coupling member and the female coupling member are coupled together, the connecting end portion rotates about the center of curvature of the spherical surface, with the spherical surface being in sealing contact with the conical seal surface.

2. The emergency detachable pipe coupling of claim 1, wherein the locking element engaging surface comprises a part of the spherical surface.

3. The emergency detachable pipe coupling of claim 2, wherein, when the locking element restraining member is displaced from the restraining position to the release position in response to tilting of the male coupling member, the locking element restraining member is stopped from displacement in the direction of the longitudinal axis by the female coupling body, and the male coupling member rotates about a fulcrum defined by a point of engagement between the to-be-pressed surface of the locking element restraining member, which has been stopped, and the pressing surface of the male coupling member, thereby allowing the connecting end portion to be moved in a direction in which the connecting end portion comes out of the female-side passage.

4. The emergency detachable pipe coupling of claim 2, wherein the to-be-pressed surface of the locking element restraining member is located forward in the direction of the longitudinal axis relative to a position of the center of curvature when the female coupling member and the male coupling member are coupled together, the to-be-pressed surface being inclined forward in the direction of the longitudinal axis.

5. The emergency detachable pipe coupling of claim 1, wherein, when the locking element restraining member is displaced from the restraining position to the release position in response to tilting of the male coupling member, the locking element restraining member is stopped from displacement in the direction of the longitudinal axis by the female coupling body, and the male coupling member rotates about a fulcrum defined by a point of engagement between the to-be-pressed surface of the locking element restraining member, which has been stopped, and the pressing surface of the male coupling member, thereby allowing the connecting end portion to be moved in a direction in which the connecting end portion comes out of the female-side passage.

6. The emergency detachable pipe coupling of claim 1, wherein the male coupling member further includes a male-side valve member displaceable between a closed position, in which the male-side valve member closes the male-side passage, and an open position, in which the male-side valve member opens the male-side passage, and a male-side valve urging member urging the male-side valve member toward the closed position;
  wherein, when the connecting end portion of the male coupling member is inserted into the female-side passage, the male-side valve member engages the female-side valve member and is pressed and displaced to the open position.

7. The emergency detachable pipe coupling of claim 1, wherein the locking element restraining member includes an inner sleeve slidably disposed over an outer peripheral surface of the female coupling body to engage the locking element, and an outer sleeve having the to-be-pressed surface and slidably disposed over an outer peripheral surface of the inner sleeve;
  wherein the urging member comprises a first spring urging the outer sleeve, and a second spring urging the inner sleeve;
  wherein the inner sleeve is pressed against the outer sleeve by the second spring and is displaced together with the outer sleeve when the locking element restraining member is displaced from the restraining position to the release position, and when the inner sleeve is displaced against an urging force of the second spring, without displacing the outer sleeve, from a position where the locking element restraining member is in the restraining position, the inner sleeve and the locking element are disengaged from each other, and the locking element becomes displaceable to the unlocking position.

8. The emergency detachable pipe coupling of claim 1, wherein the female coupling body has an outer body part and an inner body part slidably disposed in the outer body part to retain the urging member and the locking element;
  wherein, when the male coupling member is pulled away from the female coupling member in the direction of the longitudinal axis, the inner body part which has been locked to the connecting end portion by the locking element is displaced, together with the male coupling member, in the direction of the longitudinal axis relative to the outer body part and the locking element restraining member, and thus the locking element restraining member reaches the release position.

9. The emergency detachable pipe coupling of claim 8, further comprising:
  a pressure chamber formed between an inner peripheral surface of at least one of the outer body part and the locking element restraining member and an outer peripheral surface of the inner body part, the pressure chamber being reduced in volume when the inner body part is displaced in the direction of the longitudinal axis relative to the outer body part and the locking element restraining member so that the locking element restraining member reaches the release position; and
  a communication hole formed in the inner body part to allow communication between the pressure chamber and the female-side passage.

10. The emergency detachable pipe coupling of claim 9, wherein a decrease in volume of the pressure chamber is substantially equal to an increase in volume of the female-side passage when the inner body part is displaced in the direction of the longitudinal axis relative to the outer body part and the locking element restraining member so that the locking element restraining member reaches the release position.

11. The emergency detachable pipe coupling of claim 9, wherein the pressure chamber is formed between the inner peripheral surface of the locking element restraining member and the outer peripheral surface of the inner body part;
  the emergency detachable pipe coupling further comprising:
    a first sliding seal member attached to one of the outer peripheral surface of the inner body part and the inner peripheral surface of the outer body part to sealingly engage the outer peripheral surface of the inner body part and the inner peripheral surface of the outer body part, the first sliding seal member having a first sliding engagement portion sliding in sealing engagement with another of the outer peripheral surface of the inner body part and the inner peripheral surface of the outer body part;
    a second sliding seal member attached to one of the outer peripheral surface of the inner body part and the inner peripheral surface of the locking element restraining member at a forward end of the pressure chamber to sealingly engage the outer peripheral surface of the inner body part and the inner peripheral surface of the locking element restraining member, the second sliding seal member having a second sliding engagement portion sliding in sealing engagement with another of the outer peripheral surface of the inner body part and the inner peripheral surface of the locking element restraining member; and
    a third sliding seal member attached to one of the outer peripheral surface of the inner body part and the inner peripheral surface of the locking element restraining member at a rear end of the pressure chamber to sealingly engage the outer peripheral surface of the inner body part and the inner peripheral surface of the locking element restraining member, the third sliding seal member having a third sliding engagement portion sliding in sealing engagement with another of the outer peripheral surface of the inner body part and the inner peripheral surface of the locking element restraining member;
  wherein an area of a first virtual plane having an outer periphery defined by the first sliding engagement portion is substantially equal to an area obtained by subtracting an area of a second virtual plane having an outer periphery defined by the second sliding engagement portion from an area of a third virtual plane having an outer periphery defined by the third sliding engagement portion.

12. The emergency detachable pipe coupling of claim 1, wherein the female coupling body has an outer body part and an inner body part slidably disposed in the outer body part to retain the urging member and the locking element;

wherein, when the male coupling member is pulled away from the female coupling member in the direction of the longitudinal axis, the inner body part which has been locked to the connecting end portion by the locking element is displaced, together with the male coupling member, in the direction of the longitudinal axis relative to the outer body part and the locking element restraining member, and thus the locking element restraining member reaches the release position.

13. The emergency detachable pipe coupling of claim 1, further comprising:

an auxiliary sleeve secured to the female coupling member so as to contact an outer peripheral surface thereof, the auxiliary sleeve extending forward of the female coupling member;

wherein the auxiliary sleeve is configured to extend to contact the outer peripheral surface of the male coupling member when coupled to the female coupling member, so that when the male coupling member is forced to tilt relative to the female coupling member, the auxiliary sleeve produces a force resisting tilting of the male coupling member.

14. An emergency detachable pipe coupling comprising:

a female coupling member having a female-side passage extending from a forward end opening to a rear end opening; and a male coupling member having a male-side passage extending from a forward end opening to a rear end opening and further having a connecting end portion at a forward end thereof, the male coupling member being configured to be coupled to the female coupling member with the connecting end portion inserted into the female-side passage from the forward end opening of the female coupling member such that the male-side passage and the female-side passage communicate with each other;

wherein the female coupling member includes:

a cylindrical female coupling body having the female-side passage;

a locking element retained by the female coupling body displaceably between a locking position, in which the locking element projects from an inner peripheral surface of the female coupling body to engage a locking element engaging surface of the male coupling member to thereby lock the male coupling member, and an unlocking position, in which the locking element is displaced radially outward of the female coupling body from the locking position to disengage from the locking element engaging surface;

a locking element restraining member attached to the female coupling body displaceably relative to the locking element between a restraining position, in which the locking element restraining member restrains the locking element in the locking position, and a release position, in which the locking element restraining member allows the locking element to be displaced to the unlocking position; and an urging member disposed between the female coupling body and the locking element restraining member to urge the locking element restraining member toward the restraining position;

wherein the male coupling member has a pressing surface, and the locking element restraining member has a to-be-pressed surface to be engaged and pressed by the pressing surface;

wherein, when the female coupling member and the male coupling member are in a coupled state, the male coupling member is tiltable relative to a longitudinal axis of the female-side passage, and when the male coupling member is tilted at a predetermined angle, the pressing surface presses the to-be-pressed surface, causing the locking element restraining member to be displaced to the release position, and allowing the connecting end portion of the male coupling member to come out of the female coupling member;

wherein the locking element restraining member is displaceable between the restraining position and the release position in a direction of the longitudinal axis of the female-side passage;

wherein the connecting end portion has a spherical surface and rotates about a center of curvature of the spherical surface when the male coupling member is tilted until the locking element restraining member reaches the release position; and wherein the to-be-pressed surface of the locking element restraining member is located forward in the direction of the longitudinal axis relative to a position of the center of curvature when the female coupling member and the male coupling member are coupled together, the to-be-pressed surface being inclined forward in the direction of the longitudinal axis.

15. An emergency detachable pipe coupling comprising:

a female coupling member having a female-side passage extending from a forward end opening to a rear end opening; and a male coupling member having a male-side passage extending from a forward end opening to a rear end opening and further having a connecting end portion at a forward end thereof, the male coupling member being configured to be coupled to the female coupling member with the connecting end portion inserted into the female-side passage from the forward end opening of the female coupling member such that the male-side passage and the female-side passage communicate with each other;

wherein the female coupling member includes:

a cylindrical female coupling body having the female-side passage;

a locking element retained by the female coupling body displaceably between a locking position, in which the locking element projects from an inner peripheral surface of the female coupling body to engage a locking element engaging surface of the male coupling member to thereby lock the male coupling member, and an unlocking position, in which the locking element is displaced radially outward of the female coupling body from the locking position to disengage from the locking element engaging surface;

a locking element restraining member attached to the female coupling body displaceably relative to the locking element between a restraining position, in which the locking element restraining member restrains the locking element in the locking position, and a release position, in which the locking element restraining member allows the locking element to be displaced to the unlocking position; and an urging member disposed between the female coupling body and the locking element restraining member to urge the locking element restraining member toward the restraining position;

wherein the male coupling member has a pressing surface, and the locking element restraining member has a to-be-pressed surface to be engaged and pressed by the pressing surface;

wherein, when the female coupling member and the male coupling member are in a coupled state, the male coupling member is tiltable relative to a longitudinal axis of the female-side passage, and when the male coupling member is tilted at a predetermined angle, the pressing surface presses the to-be-pressed surface, causing the locking element restraining member to be displaced to the release position, and allowing the connecting end portion of the male coupling member to come out of the female coupling member;

wherein the locking element restraining member is displaceable between the restraining position and the release position in a direction of the longitudinal axis of the female-side passage;

wherein the locking element restraining member includes an inner sleeve slidably disposed over an outer peripheral surface of the female coupling body to engage the locking element, and an outer sleeve having the to-be-pressed surface and slidably disposed over an outer peripheral surface of the inner sleeve;

wherein the urging member comprises a first spring urging the outer sleeve, and a second spring urging the inner sleeve; and wherein the inner sleeve is pressed against the outer sleeve by the second spring and displaced together with the outer sleeve when the locking element restraining member is displaced from the restraining position to the release position, and when the inner sleeve is displaced against an urging force of the second spring, without displacing the outer sleeve, from a position in which the locking element restraining member is in the restraining position, the inner sleeve and the locking element are disengaged from each other, and the locking element becomes displaceable to the unlocking position.

16. The emergency detachable pipe coupling of claim 15, wherein the outer sleeve has an opening extending therethrough from an outer peripheral surface to inner peripheral surface thereof, so that a part of the outer peripheral surface of the inner sleeve is exposed through the opening.

* * * * *